(12) United States Patent
Li

(10) Patent No.: US 10,110,541 B2
(45) Date of Patent: Oct. 23, 2018

(54) OPTIMIZATION OF POSTING IN SOCIAL NETWORKS USING CONTENT DELIVERY PREFERENCES COMPRISING HASHTAGS THAT CORRESPOND TO GEOGRAPHY AND A CONTENT TYPE ASSOCIATED WITH A DESIRED TIME WINDOW

(71) Applicant: International Business Machines Corporation, Armonk, NY (US)

(72) Inventor: Jenny S. Li, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 635 days.

(21) Appl. No.: 14/055,937

(22) Filed: Oct. 17, 2013

(65) Prior Publication Data

US 2015/0113070 A1 Apr. 23, 2015

(51) Int. Cl.
*G06F 15/16* (2006.01)
*H04L 12/58* (2006.01)
(Continued)

(52) U.S. Cl.
CPC ........ *H04L 51/32* (2013.01); *G06F 17/30038* (2013.01); *G06F 17/30041* (2013.01);
(Continued)

(58) Field of Classification Search
CPC ......... H04L 51/32; H04L 51/20; H04L 67/32; H04L 67/325; H04L 67/306; H04L 67/26;
(Continued)

(56) References Cited

U.S. PATENT DOCUMENTS 5,815,671 A * 9/1998 Morrison ............. H04H 20/106
348/E7.024
6,128,655 A * 10/2000 Fields ............... G06F 17/30867
707/E17.109
(Continued)

OTHER PUBLICATIONS

Jiao et al, "Cost Optimization for Online Social Networks on Geo-Distributed Clouds" IEEE 2012 20th IEEE International Conference on Network Protocols (ICNP), Oct. 30-Nov. 2, 2012; pp. 1-10.
(Continued)

*Primary Examiner* — Daniel C. Murray
(74) *Attorney, Agent, or Firm* — Cantor Colburn LLP; William A. Kinnaman, Jr.

(57) ABSTRACT

Embodiments of the disclosure relate to optimizing postings in a social network. Embodiments include receiving content delivery preferences that correspond to a geography and an optimal time window for the geography from a content provider. Embodiments also include adjusting the content delivery preferences to create optimized content delivery preferences. Embodiments further include receiving a post to the social network from the content provider at a posting time and determining if the posting time is within the optimal time window for the geography. Based on a determining that the posting time is within the optimal time window for the geography, embodiments include delivering the posting to one or more users in the geography targeted by the posting corresponding to the optimal time window.

11 Claims, 3 Drawing Sheets

(51) Int. Cl.
*G06F 17/30* (2006.01)
*H04L 29/08* (2006.01)
*H04W 4/06* (2009.01)
*H04W 4/02* (2018.01)

(52) U.S. Cl.
CPC ........ *G06F 17/30044* (2013.01); *H04L 51/20* (2013.01); *H04L 67/306* (2013.01); *H04W 4/025* (2013.01); *H04W 4/06* (2013.01)

(58) Field of Classification Search
CPC ......... G06F 17/30041; G06F 17/30044; G06F 17/30038; G06Q 50/01; G06Q 30/0269; H04W 4/025; H04W 4/028; H04W 4/02; H04W 4/06
USPC ........................................................ 709/206
See application file for complete search history.

(56) References Cited

U.S. PATENT DOCUMENTS

| | | | | |
|---|---|---|---|---|
| 6,148,330 | A * | 11/2000 | Puri | G06F 17/30867 707/E17.109 |
| 6,594,693 | B1 * | 7/2003 | Borwankar | H04L 12/1827 709/203 |
| 6,725,460 | B1 * | 4/2004 | Nishiyama | H04N 7/17336 348/722 |
| 6,834,195 | B2 * | 12/2004 | Brandenberg | G01S 5/02 340/539.11 |
| 6,886,029 | B1 * | 4/2005 | Pecus | H04L 12/1836 348/E17.003 |
| 6,996,393 | B2 * | 2/2006 | Pyhalammi | H04L 12/14 375/220 |
| 7,072,670 | B2 * | 7/2006 | Sato | H04W 4/02 455/414.2 |
| 7,130,908 | B1 * | 10/2006 | Pecus | H04B 7/18582 709/226 |
| 7,154,898 | B1 * | 12/2006 | Pecus | H04N 21/23103 348/E5.008 |
| 7,174,373 | B1 * | 2/2007 | Lausier | H04B 7/1858 709/223 |
| 7,237,017 | B1 * | 6/2007 | Pecus | H04B 7/18578 709/201 |
| 7,251,604 | B1 * | 7/2007 | Thenthiruperai | G10L 15/22 704/270.1 |
| 7,251,676 | B2 * | 7/2007 | Kuth | G06F 17/3089 707/E17.116 |
| 7,313,525 | B1 * | 12/2007 | Packingham | G10L 15/22 704/270 |
| 7,360,160 | B2 * | 4/2008 | Matz | G06F 17/30867 707/E17.109 |
| 7,398,080 | B2 * | 7/2008 | Pyhalammi | H04L 12/14 455/405 |
| 7,406,329 | B2 * | 7/2008 | Khurana | G06F 17/30867 455/414.1 |
| 7,441,203 | B2 * | 10/2008 | Othmer | G06Q 30/0243 455/456.1 |
| 7,568,003 | B2 * | 7/2009 | Zhang | G06F 17/3089 709/201 |
| 7,593,939 | B2 * | 9/2009 | Weininger | G06F 17/30699 |
| 7,621,814 | B2 * | 11/2009 | Garcia | G07F 17/32 463/1 |
| 7,627,652 | B1 * | 12/2009 | Commons | H04L 67/1097 709/213 |
| 7,647,387 | B2 * | 1/2010 | Bellare | G06F 17/3089 209/217 |
| 7,698,720 | B2 * | 4/2010 | Matz | H04H 60/16 725/34 |
| 7,747,963 | B2 * | 6/2010 | Othmer | G06Q 30/0243 709/219 |
| 7,751,804 | B2 * | 7/2010 | Steelberg | H04H 60/06 455/3.01 |
| 7,805,406 | B2 * | 9/2010 | Craig | H04L 67/306 707/622 |
| 7,818,764 | B2 * | 10/2010 | Matz | H04N 7/163 725/34 |
| 7,831,512 | B2 * | 11/2010 | Akadiri | G06Q 30/00 705/50 |
| 7,835,993 | B2 * | 11/2010 | Okamoto | G06F 21/10 380/278 |
| 7,870,125 | B1 * | 1/2011 | Istvan | H04N 21/2355 707/722 |
| 7,882,201 | B2 * | 2/2011 | Frazier | G06F 17/30041 340/995.1 |
| 7,949,726 | B2 * | 5/2011 | Freeberg | H04L 67/06 709/218 |
| 7,970,868 | B2 * | 6/2011 | Garg | G06Q 10/10 709/206 |
| 8,024,342 | B2 * | 9/2011 | Li | G06F 17/30616 707/736 |
| 8,046,435 | B1 * | 10/2011 | Parekh | G06F 15/0291 709/219 |
| 8,086,491 | B1 * | 12/2011 | Matz | G06Q 30/02 705/14.49 |
| 8,103,741 | B2 * | 1/2012 | Frazier | G06F 17/30041 340/995.1 |
| 8,127,327 | B2 * | 2/2012 | Ijeomah | H04N 7/163 725/34 |
| 8,136,135 | B2 * | 3/2012 | Matz | H04N 7/163 725/34 |
| 8,209,223 | B2 * | 6/2012 | Fink | G06Q 30/02 386/241 |
| 8,214,738 | B2 * | 7/2012 | Othmer | G06Q 30/0243 345/169 |
| 8,219,134 | B2 * | 7/2012 | Maharajh | G06F 17/30035 455/3.01 |
| 8,219,555 | B1 * | 7/2012 | Mianji | G06F 17/30722 707/736 |
| 8,219,618 | B2 * | 7/2012 | Kiyohara | H04L 67/104 709/205 |
| 8,219,925 | B2 * | 7/2012 | Othmer | G06Q 30/0243 345/169 |
| 8,230,087 | B2 * | 7/2012 | Alve | G01S 5/0009 455/411 |
| 8,230,456 | B2 * | 7/2012 | Jacoby | H04N 7/17318 725/14 |
| 8,284,936 | B2 * | 10/2012 | Bangma | H04H 20/42 380/239 |
| 8,315,949 | B2 * | 11/2012 | Akadiri | G06Q 30/00 705/50 |
| 8,321,527 | B2 * | 11/2012 | Martin | G06F 17/3087 709/217 |
| 8,386,488 | B2 * | 2/2013 | Jones | G06F 17/30324 707/738 |
| 8,412,707 | B1 * | 4/2013 | Mianji | G06F 17/30722 707/736 |
| 8,452,790 | B1 * | 5/2013 | Mianji | G06F 17/30722 707/758 |
| 8,504,073 | B2 * | 8/2013 | Svendsen | G06Q 30/02 455/414.2 |
| 8,522,269 | B2 * | 8/2013 | Dharmaji | G06F 15/02 455/404.1 |
| 8,539,371 | B2 * | 9/2013 | Othmer | G06Q 30/0243 345/169 |
| 8,543,608 | B2 * | 9/2013 | Koul | H04L 69/28 707/734 |
| 8,582,801 | B2 * | 11/2013 | Goto | G06F 3/0482 382/100 |
| 8,607,295 | B2 * | 12/2013 | Bhatia | H04N 21/252 725/133 |
| 8,612,450 | B1 * | 12/2013 | Proffit | G06F 17/30817 707/740 |
| 8,612,542 | B2 * | 12/2013 | Frazier | G06F 17/30041 340/995.1 |
| 8,615,565 | B2 * | 12/2013 | Randall | G06Q 30/02 709/206 |
| 8,631,473 | B2 * | 1/2014 | Bhatia | H04N 21/252 725/10 |
| 8,635,674 | B2 * | 1/2014 | Bhatia | H04N 21/252 725/10 |

(56) References Cited

U.S. PATENT DOCUMENTS

| | | | | |
|---|---|---|---|---|
| 8,650,125 B2* | 2/2014 | Akadiri | ............... | G06Q 30/00 705/14.49 |
| 8,650,587 B2* | 2/2014 | Bhatia | ............... | H04N 21/252 725/12 |
| 8,655,981 B2* | 2/2014 | Kiyohara | ............ | H04L 41/0893 707/715 |
| 8,667,520 B2* | 3/2014 | Bhatia | ............... | H04N 21/252 725/10 |
| 8,671,021 B2* | 3/2014 | Maharajh | ......... | G06F 17/30035 705/14.4 |
| 8,682,794 B2* | 3/2014 | Akadiri | ............... | G06Q 30/00 705/50 |
| 8,688,582 B2* | 4/2014 | Akadiri | ............... | G06Q 30/00 705/50 |
| 8,688,671 B2* | 4/2014 | Ramer | ............... | G06Q 30/02 707/706 |
| 8,706,886 B2* | 4/2014 | Aiello | ............... | H04L 67/104 455/414.3 |
| 8,707,351 B2* | 4/2014 | Dharmaji | ............... | G06F 15/02 455/404.1 |
| 8,712,778 B1* | 4/2014 | Thenthiruperai | ....... | G10L 15/22 704/231 |
| 8,732,766 B2* | 5/2014 | Fink | ............... | G06Q 30/02 345/629 |
| 8,762,850 B2* | 6/2014 | Matz | ............... | G06F 17/30867 715/723 |
| 8,805,270 B2* | 8/2014 | Maharajh | ......... | G06F 17/30035 455/3.01 |
| 8,855,469 B2* | 10/2014 | Maharajh | ......... | G06F 17/30035 386/205 |
| 8,880,649 B2* | 11/2014 | Randall | ............... | G06Q 30/02 709/206 |
| 8,914,375 B2* | 12/2014 | Jones | ............... | G06F 17/30324 707/738 |
| 8,923,889 B2* | 12/2014 | Svendsen | ............... | G06Q 30/02 455/456.3 |
| 8,930,448 B2* | 1/2015 | Doyle | ............... | H04L 67/06 709/203 |
| 8,935,722 B2* | 1/2015 | Matz | ............... | H04N 7/163 725/34 |
| 8,938,755 B2* | 1/2015 | Goodwin | ......... | G06F 17/30029 725/39 |
| 8,943,538 B2* | 1/2015 | Jacoby | ............... | H04N 7/17318 725/34 |
| 8,955,001 B2* | 2/2015 | Bhatia | ............... | H04N 21/252 725/12 |
| 8,978,086 B2* | 3/2015 | Bhatia | ............... | H04N 21/252 725/133 |
| 8,995,815 B2* | 3/2015 | Maharajh | ......... | G06F 17/30035 386/205 |
| 9,009,754 B2* | 4/2015 | Dharmaji | ............... | G06F 15/02 455/404.1 |
| 9,037,643 B2* | 5/2015 | Kazerani | ............... | H04L 67/20 709/203 |
| 9,047,626 B2* | 6/2015 | Akadiri | ............... | G06Q 30/00 |
| 9,055,074 B2* | 6/2015 | Harris | ............... | G06F 17/3087 |
| 9,064,010 B2* | 6/2015 | Maharajh | ......... | G06F 17/30035 |
| 9,064,011 B2* | 6/2015 | Maharajh | ......... | G06F 17/30035 |
| 9,106,941 B2* | 8/2015 | Dharmaji | ............... | G06F 15/02 |
| 9,117,228 B1* | 8/2015 | Akadiri | ............... | G06Q 30/00 |
| 9,124,906 B2* | 9/2015 | Robert | ............ | H04N 21/23109 |
| 9,160,802 B2* | 10/2015 | Svendsen | ............... | G06Q 30/02 |
| 9,203,927 B1* | 12/2015 | Mecklenburg | ......... | H04L 67/32 |
| 9,237,377 B2* | 1/2016 | Bhatia | ............... | H04N 21/252 |
| 9,247,002 B1* | 1/2016 | Randall | ............... | G06Q 30/02 |
| 9,264,764 B2* | 2/2016 | Bhatia | ............... | H04N 21/252 |
| 9,349,136 B2* | 5/2016 | Akadiri | ............... | G06Q 30/00 |
| 9,369,519 B2* | 6/2016 | Doyle | ............... | H04L 67/06 |
| 9,432,713 B2* | 8/2016 | Bhatia | ............... | H04N 21/252 |
| 9,479,838 B2* | 10/2016 | Makhlouf | ......... | H04N 7/17336 |
| 9,547,832 B2* | 1/2017 | Gordon | ............... | G06Q 10/06 |
| 9,560,478 B2* | 1/2017 | Murad | ............... | H04N 21/214 |
| 9,571,874 B2* | 2/2017 | Bhatia | ............... | H04N 21/252 |
| 2002/0056102 A1* | 5/2002 | Dillon | ............... | H04N 7/17345 725/39 |
| 2002/0069261 A1* | 6/2002 | Bellare | ............... | G06Q 30/02 709/218 |
| 2002/0120667 A1* | 8/2002 | Nakano | ............... | H04N 5/76 709/200 |
| 2002/0144283 A1* | 10/2002 | Headings | ............... | H04N 7/165 725/109 |
| 2003/0045273 A1* | 3/2003 | Pyhalammi | ............ | H04L 12/14 455/412.1 |
| 2003/0063072 A1* | 4/2003 | Brandenberg | ............ | G01S 5/02 345/173 |
| 2003/0065665 A1* | 4/2003 | Kinjo | ............... | H04L 67/2804 |
| 2004/0143386 A1* | 7/2004 | Yoshihara | ............ | G01C 21/34 701/410 |
| 2004/0168121 A1* | 8/2004 | Matz | ............... | G06F 17/30867 715/255 |
| 2004/0172655 A1* | 9/2004 | Nishiyama | ............ | H04N 21/812 725/97 |
| 2004/0216163 A1* | 10/2004 | Whitcomb | ......... | H04N 7/17336 725/74 |
| 2004/0255321 A1* | 12/2004 | Matz | ............... | H04H 60/16 725/14 |
| 2004/0261096 A1* | 12/2004 | Matz | ............... | H04N 7/163 725/28 |
| 2005/0033849 A1* | 2/2005 | Matz | ............... | H04L 29/06 709/228 |
| 2005/0043060 A1* | 2/2005 | Brandenberg | ............ | G01S 5/02 455/558 |
| 2005/0165686 A1* | 7/2005 | Zack | ............... | G06Q 20/10 705/51 |
| 2005/0170848 A1* | 8/2005 | Sato | ............... | H04W 4/02 455/456.3 |
| 2005/0203917 A1* | 9/2005 | Freeberg | ............... | H04L 67/06 |
| 2005/0240608 A1* | 10/2005 | Jones | ............... | G06F 17/30324 |
| 2006/0019642 A1* | 1/2006 | Steelberg | ............... | H04H 60/07 455/414.3 |
| 2006/0052089 A1* | 3/2006 | Khurana | ............ | G06F 17/30867 455/414.1 |
| 2006/0073810 A1* | 4/2006 | Pyhalammi | ............. | H04L 12/14 455/407 |
| 2006/0190401 A1* | 8/2006 | Akadiri | ............... | G06Q 30/00 705/50 |
| 2006/0212516 A1* | 9/2006 | Shikatani | ............... | H04N 7/173 709/205 |
| 2006/0230173 A1* | 10/2006 | Chen | ............... | H04L 67/325 709/231 |
| 2006/0236257 A1* | 10/2006 | Othmer | ............ | G06Q 30/0243 715/774 |
| 2006/0242267 A1* | 10/2006 | Grossman | ............ | G06Q 30/02 709/218 |
| 2006/0271959 A1* | 11/2006 | Jacoby | ............... | H04N 7/17318 725/46 |
| 2006/0271960 A1* | 11/2006 | Jacoby | ............... | H04N 7/17318 725/46 |
| 2006/0271961 A1* | 11/2006 | Jacoby | ............... | H04N 7/17318 725/46 |
| 2006/0271997 A1* | 11/2006 | Jacoby | ............... | H04N 7/17318 725/135 |
| 2007/0061363 A1* | 3/2007 | Ramer | ............... | G06Q 30/02 |
| 2007/0110056 A1* | 5/2007 | Hwang | ............... | H04H 20/72 370/389 |
| 2007/0110057 A1* | 5/2007 | Hwang | ............... | H04N 7/17318 370/389 |
| 2007/0157251 A1* | 7/2007 | Shrivastava | ...... | G06F 17/30058 725/60 |
| 2007/0180523 A1* | 8/2007 | Jablonski | ............... | G06F 21/10 726/22 |
| 2007/0208737 A1* | 9/2007 | Li | ............... | H04L 67/26 |
| 2007/0239716 A1* | 10/2007 | Weininger | ......... | G06F 17/30699 |
| 2007/0243860 A1* | 10/2007 | Aiello | ............... | H04L 67/104 455/414.3 |
| 2007/0255829 A1* | 11/2007 | Pecus | ............... | H04B 7/18578 709/225 |

(56) References Cited

U.S. PATENT DOCUMENTS

| | | | |
|---|---|---|---|
| 2007/0256015 A1* | 11/2007 | Matz | G06F 17/30867 715/716 |
| 2008/0022003 A1* | 1/2008 | Alve | G01S 5/0009 709/229 |
| 2008/0052741 A1* | 2/2008 | Dharmaji | G06F 15/02 725/32 |
| 2008/0104079 A1* | 5/2008 | Craig | H04L 67/306 |
| 2008/0104172 A1* | 5/2008 | Craig | H04L 67/306 709/204 |
| 2008/0104495 A1* | 5/2008 | Craig | H04L 67/306 715/205 |
| 2008/0104679 A1* | 5/2008 | Craig | H04L 67/306 726/4 |
| 2008/0182559 A1* | 7/2008 | Pyhalammi | H04L 12/14 455/412.1 |
| 2008/0195664 A1* | 8/2008 | Maharajh | G06F 17/30035 |
| 2008/0200154 A1* | 8/2008 | Maharajh | G06F 17/30035 455/414.3 |
| 2008/0201225 A1* | 8/2008 | Maharajh | G06F 17/30035 705/14.43 |
| 2008/0201386 A1* | 8/2008 | Maharajh | G06F 17/30035 |
| 2008/0207137 A1* | 8/2008 | Maharajh | G06F 17/30035 455/74 |
| 2008/0207182 A1* | 8/2008 | Maharajh | G06F 17/30035 455/414.1 |
| 2008/0244037 A1* | 10/2008 | Okuda | H04N 7/17318 709/217 |
| 2008/0250337 A1 | 10/2008 | Lemmela et al. | |
| 2008/0270538 A1* | 10/2008 | Garg | G06Q 10/10 709/204 |
| 2009/0037387 A1* | 2/2009 | Kim | H04N 7/17318 |
| 2009/0049408 A1 | 2/2009 | Naaman et al. | |
| 2009/0132378 A1* | 5/2009 | Othmer | G06Q 30/0243 705/14.42 |
| 2009/0132640 A1* | 5/2009 | Verma | G06F 17/30864 709/203 |
| 2009/0138573 A1* | 5/2009 | Campbell | G06F 21/554 709/218 |
| 2009/0138925 A1* | 5/2009 | Headings | H04N 7/165 725/109 |
| 2009/0144772 A1* | 6/2009 | Fink | G06Q 30/02 725/42 |
| 2009/0248833 A1* | 10/2009 | Frazier | G06F 17/30041 709/217 |
| 2009/0319187 A1 | 12/2009 | Deeming et al. | |
| 2010/0027792 A1* | 2/2010 | Bangma | H04H 20/42 380/239 |
| 2010/0030766 A1* | 2/2010 | Li | G06F 17/30616 707/749 |
| 2010/0041419 A1* | 2/2010 | Svendsen | G06Q 30/02 455/456.3 |
| 2010/0064007 A1* | 3/2010 | Randall | G06Q 30/02 709/204 |
| 2010/0180007 A1* | 7/2010 | Suh | H04N 21/235 709/217 |
| 2010/0180029 A1* | 7/2010 | Fourman | G06F 17/30867 709/225 |
| 2010/0223119 A1* | 9/2010 | Klish | G06Q 10/00 705/14.26 |
| 2010/0269058 A1* | 10/2010 | Othmer | G06Q 30/0243 715/774 |
| 2010/0269059 A1* | 10/2010 | Othmer | G06Q 30/0243 715/774 |
| 2010/0293246 A1* | 11/2010 | Urazoe | G06F 21/6218 709/217 |
| 2010/0318596 A1* | 12/2010 | Bergman | H04L 67/16 709/203 |
| 2010/0325653 A1* | 12/2010 | Matz | H04N 7/163 725/28 |
| 2011/0060649 A1* | 3/2011 | Dunk | G06F 17/3002 705/14.53 |
| 2011/0060727 A1* | 3/2011 | Koul | H04L 67/02 707/689 |
| 2011/0060807 A1* | 3/2011 | Martin | G06F 17/3087 709/217 |
| 2011/0072084 A1* | 3/2011 | Kiyohara | H04L 41/0893 709/204 |
| 2011/0072088 A1* | 3/2011 | Kiyohara | H04L 67/104 709/205 |
| 2011/0099263 A1* | 4/2011 | Patil | G06Q 50/01 709/224 |
| 2011/0113119 A1* | 5/2011 | Frazier | G06F 17/30041 709/217 |
| 2011/0125793 A1* | 5/2011 | Erhart | G06Q 30/02 707/776 |
| 2011/0238762 A1 | 9/2011 | Soni et al. | |
| 2011/0238782 A1* | 9/2011 | Akadiri | G06Q 30/00 709/217 |
| 2011/0246482 A1* | 10/2011 | Badenes | G06F 17/30011 707/748 |
| 2011/0287786 A1* | 11/2011 | Cassapakis | G06F 17/3087 455/456.3 |
| 2011/0307830 A1* | 12/2011 | Robert | H04N 21/23109 715/810 |
| 2012/0016948 A1* | 1/2012 | Sinha | G06Q 10/10 709/207 |
| 2012/0047011 A1* | 2/2012 | Rippetoe | G06Q 30/02 705/14.45 |
| 2012/0096361 A1 | 4/2012 | Berry et al. | |
| 2012/0110119 A1* | 5/2012 | Levicki | H04N 21/2541 709/217 |
| 2012/0122489 A1* | 5/2012 | Frazier | G06F 17/30041 455/456.3 |
| 2012/0124090 A1* | 5/2012 | Matz | G06Q 30/02 707/780 |
| 2012/0136965 A1* | 5/2012 | Matz | H04N 7/163 709/217 |
| 2012/0185238 A1* | 7/2012 | Bhatti | G06Q 30/02 704/9 |
| 2012/0208512 A1* | 8/2012 | Maharajh | G06F 17/30035 455/414.1 |
| 2012/0215839 A1* | 8/2012 | Doyle | H04L 67/06 709/203 |
| 2012/0215890 A1* | 8/2012 | Doyle | H04L 67/06 709/219 |
| 2012/0246685 A1* | 9/2012 | Fink | G06Q 30/02 725/60 |
| 2012/0258735 A1 | 10/2012 | Monteverde | |
| 2012/0296991 A1 | 11/2012 | Spivack et al. | |
| 2013/0006980 A1* | 1/2013 | Frumin | G06F 17/30575 707/736 |
| 2013/0014136 A1* | 1/2013 | Bhatia | H04N 21/252 725/9 |
| 2013/0014137 A1* | 1/2013 | Bhatia | H04N 21/252 725/9 |
| 2013/0014138 A1* | 1/2013 | Bhatia | H04N 21/252 725/9 |
| 2013/0014141 A1* | 1/2013 | Bhatia | H04N 21/252 725/10 |
| 2013/0014143 A1* | 1/2013 | Bhatia | H04N 21/252 725/13 |
| 2013/0014144 A1* | 1/2013 | Bhatia | H04N 21/252 725/13 |
| 2013/0014145 A1* | 1/2013 | Bhatia | H04N 21/252 725/13 |
| 2013/0014146 A1* | 1/2013 | Bhatia | H04N 21/252 725/14 |
| 2013/0014153 A1* | 1/2013 | Bhatia | H04N 21/252 725/24 |
| 2013/0014158 A1* | 1/2013 | Bhatia | H04N 21/252 725/34 |
| 2013/0014222 A1* | 1/2013 | Bhatia | H04N 21/252 726/4 |
| 2013/0014223 A1* | 1/2013 | Bhatia | H04N 21/252 726/4 |
| 2013/0019258 A1* | 1/2013 | Bhatia | H04N 21/252 725/13 |

(56) References Cited

U.S. PATENT DOCUMENTS

| | | | | |
|---|---|---|---|---|
| 2013/0019262 A1* | 1/2013 | Bhatia | H04N 21/252 | 725/34 |
| 2013/0064527 A1* | 3/2013 | Maharajh | G06F 17/30035 | 386/343 |
| 2013/0074009 A1* | 3/2013 | Jones | G06F 17/30324 | 715/810 |
| 2013/0080578 A1* | 3/2013 | Murad | H04N 21/214 | 709/217 |
| 2013/0097009 A1* | 4/2013 | Akadiri | G06Q 30/00 | 705/14.41 |
| 2013/0124683 A1* | 5/2013 | Watanabe | H04N 21/4622 | 709/217 |
| 2013/0179440 A1* | 7/2013 | Gordon | G06Q 10/06 | 707/731 |
| 2013/0218862 A1* | 8/2013 | Ghosh | G06F 17/30554 | 707/706 |
| 2013/0246518 A1* | 9/2013 | Nace | G06Q 50/01 | 709/204 |
| 2013/0254897 A1* | 9/2013 | Reedy | G06F 21/6218 | 726/26 |
| 2013/0262619 A1* | 10/2013 | Goodwin | G06F 17/30029 | 709/217 |
| 2013/0282839 A1* | 10/2013 | Alcala | G06Q 50/01 | 709/206 |
| 2013/0290483 A1* | 10/2013 | Svendsen | G06Q 30/02 | 709/217 |
| 2013/0297429 A1* | 11/2013 | Akadiri | G06Q 30/00 | 705/14.71 |
| 2013/0297694 A1* | 11/2013 | Ghosh | H04L 67/02 | 709/204 |
| 2013/0298009 A1* | 11/2013 | Akadiri | G06Q 30/00 | 715/234 |
| 2013/0311408 A1* | 11/2013 | Bagga | G06N 99/005 | 706/12 |
| 2013/0312028 A1* | 11/2013 | Dharmaji | G06F 15/02 | 725/34 |
| 2013/0339149 A1* | 12/2013 | Akadiri | G06Q 30/00 | 705/14.54 |
| 2013/0339152 A1* | 12/2013 | Akadiri | G06Q 30/00 | 705/14.64 |
| 2014/0019891 A1* | 1/2014 | Borah | G06F 8/30 | 715/762 |
| 2014/0040371 A1* | 2/2014 | Gurevich | H04L 61/609 | 709/204 |
| 2014/0040427 A1* | 2/2014 | Doyle | H04L 67/06 | 709/217 |
| 2014/0057658 A1* | 2/2014 | Murad | H04N 21/214 | 455/456.3 |
| 2014/0074984 A1* | 3/2014 | Frazier | G06F 17/30041 | 709/217 |
| 2014/0108613 A1* | 4/2014 | Randall | G06Q 30/02 | 709/218 |
| 2014/0137153 A1* | 5/2014 | Fay | H04N 21/6175 | 725/39 |
| 2014/0173020 A1* | 6/2014 | Reilly | H04L 67/32 | 709/217 |
| 2014/0173641 A1* | 6/2014 | Bhatia | H04N 21/252 | 725/9 |
| 2014/0173643 A1* | 6/2014 | Bhatia | H04N 21/252 | 725/13 |
| 2014/0201180 A1* | 7/2014 | Fatourechi | G06F 17/30038 | 707/706 |
| 2014/0201258 A1* | 7/2014 | Jowett | H04W 4/003 | 709/203 |
| 2014/0201785 A1* | 7/2014 | Dharmaji | G06F 15/02 | 725/34 |
| 2014/0215513 A1* | 7/2014 | Ramer | G06Q 30/02 | 725/34 |
| 2014/0222478 A1* | 8/2014 | Wang | G06Q 10/06311 | 705/7.13 |
| 2014/0223573 A1* | 8/2014 | Reedy | G06F 21/6218 | 726/26 |
| 2014/0258469 A1* | 9/2014 | Maharajh | G06F 17/30035 | 709/219 |
| 2014/0280479 A1* | 9/2014 | Kazerani | H04L 67/20 | 709/203 |
| 2014/0280480 A1* | 9/2014 | Kazerani | H04L 41/5019 | 709/203 |
| 2014/0316903 A1* | 10/2014 | Maharajh | G06F 17/30035 | 705/14.66 |
| 2014/0317112 A1* | 10/2014 | Maharajh | G06F 17/30035 | 707/736 |
| 2014/0325030 A1* | 10/2014 | Maharajh | G06F 17/30035 | 709/219 |
| 2014/0342659 A1* | 11/2014 | Maharajh | G06F 17/30035 | 455/3.01 |
| 2014/0365618 A1* | 12/2014 | Doyle | H04L 67/06 | 709/219 |
| 2015/0006703 A1* | 1/2015 | Jowett | H04W 4/003 | 709/223 |
| 2015/0019550 A1* | 1/2015 | Maharajh | G06F 17/30035 | 707/736 |
| 2015/0058378 A1* | 2/2015 | Jones | G06F 17/30324 | 707/803 |
| 2015/0058396 A1* | 2/2015 | Frumin | G06F 17/30575 | 709/201 |
| 2015/0078247 A1* | 3/2015 | Maharajh | G06F 17/30035 | 370/312 |
| 2015/0087224 A1* | 3/2015 | Maharajh | G06F 17/30035 | 455/3.06 |
| 2015/0109338 A1* | 4/2015 | McKinnon | G06F 17/30265 | 345/633 |
| 2015/0113096 A1* | 4/2015 | Svendsen | G06Q 30/02 | 709/217 |
| 2015/0127758 A1* | 5/2015 | Frazier | G06F 17/30041 | 709/206 |
| 2015/0143390 A1* | 5/2015 | Fay | H04N 21/2668 | 725/9 |
| 2015/0150046 A1* | 5/2015 | Maharajh | G06F 17/30035 | 725/34 |
| 2015/0172729 A1* | 6/2015 | Jacoby | H04N 7/17318 | 725/34 |
| 2015/0178299 A1* | 6/2015 | Kazerani | H04L 67/20 | 709/213 |
| 2015/0195615 A1* | 7/2015 | Dharmaji | G06F 15/02 | 725/34 |
| 2015/0199382 A1* | 7/2015 | Yamada | G06F 17/30047 | 707/758 |
| 2015/0334469 A1* | 11/2015 | Bhatia | H04N 21/252 | 725/32 |
| 2015/0358667 A1* | 12/2015 | Bhatia | H04N 21/252 | 725/14 |
| 2016/0088333 A1* | 3/2016 | Bhatia | H04N 21/252 | 725/34 |
| 2016/0261679 A1* | 9/2016 | Doyle | H04L 67/06 | |
| 2016/0337709 A1* | 11/2016 | Bhatia | H04N 21/252 | |
| 2016/0360261 A1* | 12/2016 | Makhlouf | H04N 7/17336 | |
| 2017/0124593 A1* | 5/2017 | Nickerson | G06Q 30/0263 | |
| 2017/0150219 A1* | 5/2017 | Bhatia | H04N 21/44218 | |

OTHER PUBLICATIONS

Li et al, "Relationships Between Geographical Cluster and Cyberspace Community: A Case Study onMicroblog", IEEE 2012 20th International Conference on Geoinformatics (Geoinformatics); Jun. 15-17, 2012; pp. 1-5.

* cited by examiner

OPTIMIZATION OF POSTING IN SOCIAL NETWORKS USING CONTENT DELIVERY PREFERENCES COMPRISING HASHTAGS THAT CORRESPOND TO GEOGRAPHY AND A CONTENT TYPE ASSOCIATED WITH A DESIRED TIME WINDOW

BACKGROUND

The present disclosure relates to social networks, and more specifically, to optimization of posting in social networks.

Currently, social networks allow users to post content, such as messages and pictures, and to categorize postings in an ad hoc manner. Users that post content, also referred to as content providers, often use tags to attract more viewers or comments to the content that they post. In typical social networks, when a user posts content to the social network, the posting is published to the social network immediately. Accordingly, whenever a user posts something, it will be uploaded and can be seen in almost real-time to the other users of the social network. One drawback of the real-time posting of content is that the time that the content is posted is often only convenient for viewing by users who share a similar time zone with the content provider.

For users that have a big time zone difference with the content provider, there is typically a large time difference between when the content is posted and when the content is viewed. For example, if a user in New York posts a picture at 2:00 pm EST, which is equivalent to 2:00 am in part of China, the picture may be immediately viewed by people in United States. However, users of the social network in China will likely not immediately view the picture as they would be sleeping at that time. Rather, the picture will probably be viewed by users of the social network in China about seven hours later when the users wake up. The real-time posting issue is compounded by the fact that most social networks display postings in chronological order. Accordingly, in the above example, the posting of the picture will be displayed beneath all of the content posted during the time between the posting of the picture and the time the user accesses the social network.

SUMMARY

According to one embodiment, a method for optimizing postings in social networks includes receiving one or more content delivery preferences from a content provider, wherein the one or more content delivery preferences includes one or more tags that correspond to a geography and an optimal time window for the geography. The method also includes optimizing, by a processor, the one or more content delivery preferences by an optimization analyzer to create optimized content delivery preferences. The method further includes receiving a post to the social network from the content provider at a posting time, determining if the post includes one of the one or more tags, and determining if the posting time is within the optimal time window for the geography corresponding to one of the one or more tags. Based on a determining that the post includes at least one of the one or more tags and that the posting time is within the optimal time window for the geography corresponding to the at least one of the one or more tags, the method includes delivering the posting to one or more users in the geography targeted by the posting corresponding to the optimal time window. Based on a determining that the post includes at least one of the one or more tags and that the posting time is not within the optimal time window for the geography corresponding to the at least one of the one or more tags, the method includes delaying delivery of the posting to the one or more users in the geography targeted by the posting corresponding to the optimal time window.

According to another embodiment, a computer program product for optimizing postings in social networks, the computer program product including a tangible storage medium readable by a processing circuit and storing instructions for execution by the processing circuit for performing a method that includes receiving one or more content delivery preferences from a content provider, wherein the one or more content delivery preferences includes one or more tags that correspond to a geography and an optimal time window for the geography. The method also includes optimizing, by a processor, the one or more content delivery preferences by an optimization analyzer to create optimized content delivery preferences. The method further includes receiving a post to the social network from the content provider at a posting time, determining if the post includes one of the one or more tags, and determining if the posting time is within the optimal time window for the geography corresponding to one of the one or more tags. Based on a determining that the post includes at least one of the one or more tags and that the posting time is within the optimal time window for the geography corresponding to the at least one of the one or more tags, the method includes delivering the posting to one or more users in the geography targeted by the posting corresponding to the optimal time window. Based on a determining that the post includes at least one of the one or more tags and that the posting time is not within the optimal time window for the geography corresponding to the at least one of the one or more tags, the method includes delaying delivery of the posting to the one or more users in the geography targeted by the posting corresponding to the optimal time window.

According to another embodiment, a method for optimizing postings in social networks includes receiving one or more content delivery preferences from a content provider, wherein the one or more content delivery preferences comprises one or more geographical locations and an optimal time window for each of the one or more geographical locations. The method also includes adjusting, by a processor, the one or more content delivery preferences by an optimization analyzer to create optimized content delivery preferences. The method further includes receiving a post to the social network from the content provider at a posting time and determining if the posting time is within the optimal time window for one of the one or more geographical locations. Based on a determining that the posting time is within the optimal time window for one of the one or more geographical locations, the method includes delivering the posting to one or more users in the geography corresponding to the optimal time window. Based on a determining that the posting time is not within the optimal time window for one of the one or more geographical locations, the method includes delaying delivery of the posting to the one or more users in the geography corresponding to the optimal time window for a period of time.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for optimizing postings in social networks are provided. In exemplary embodiments, a user can configure optimal viewing times based on the content of the post and/or the geographical location of the viewers.

Figure 1:
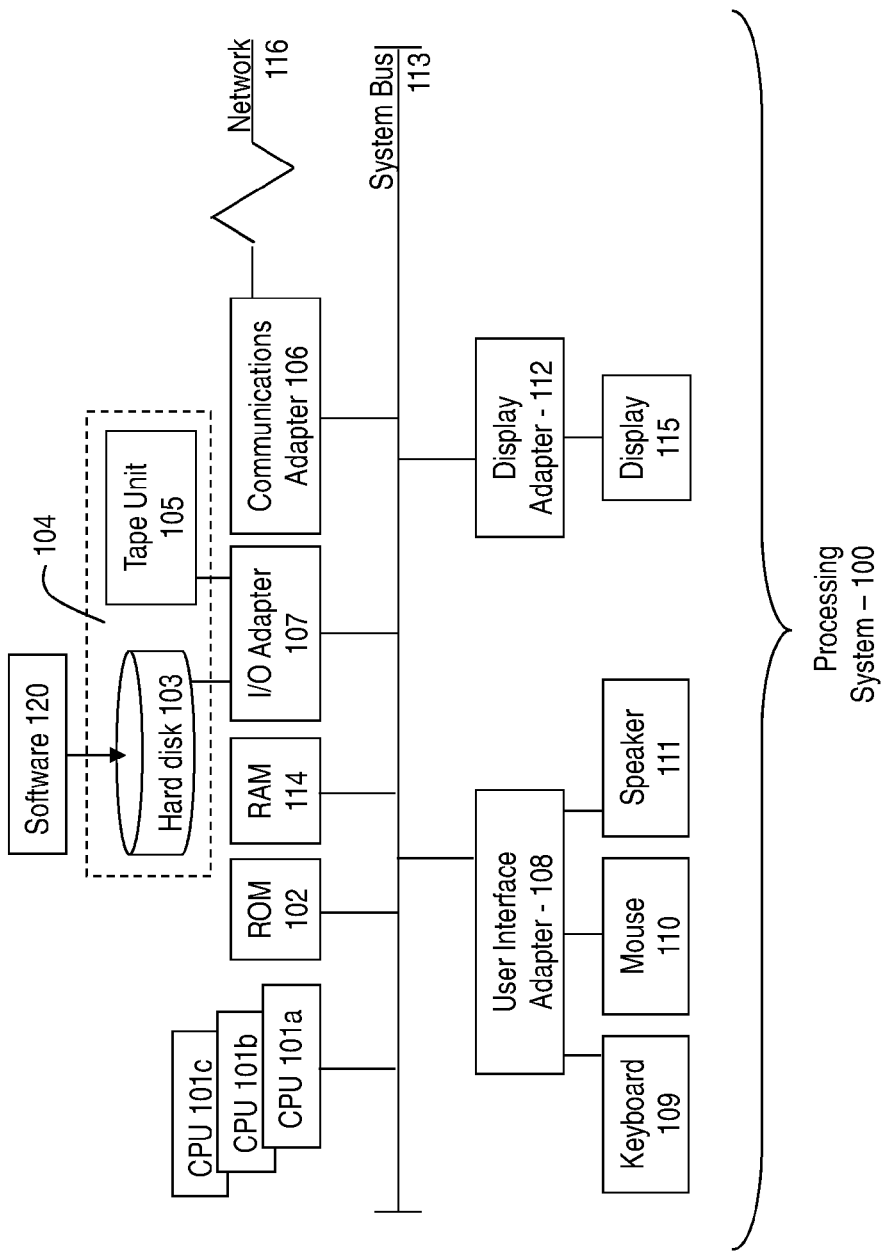
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
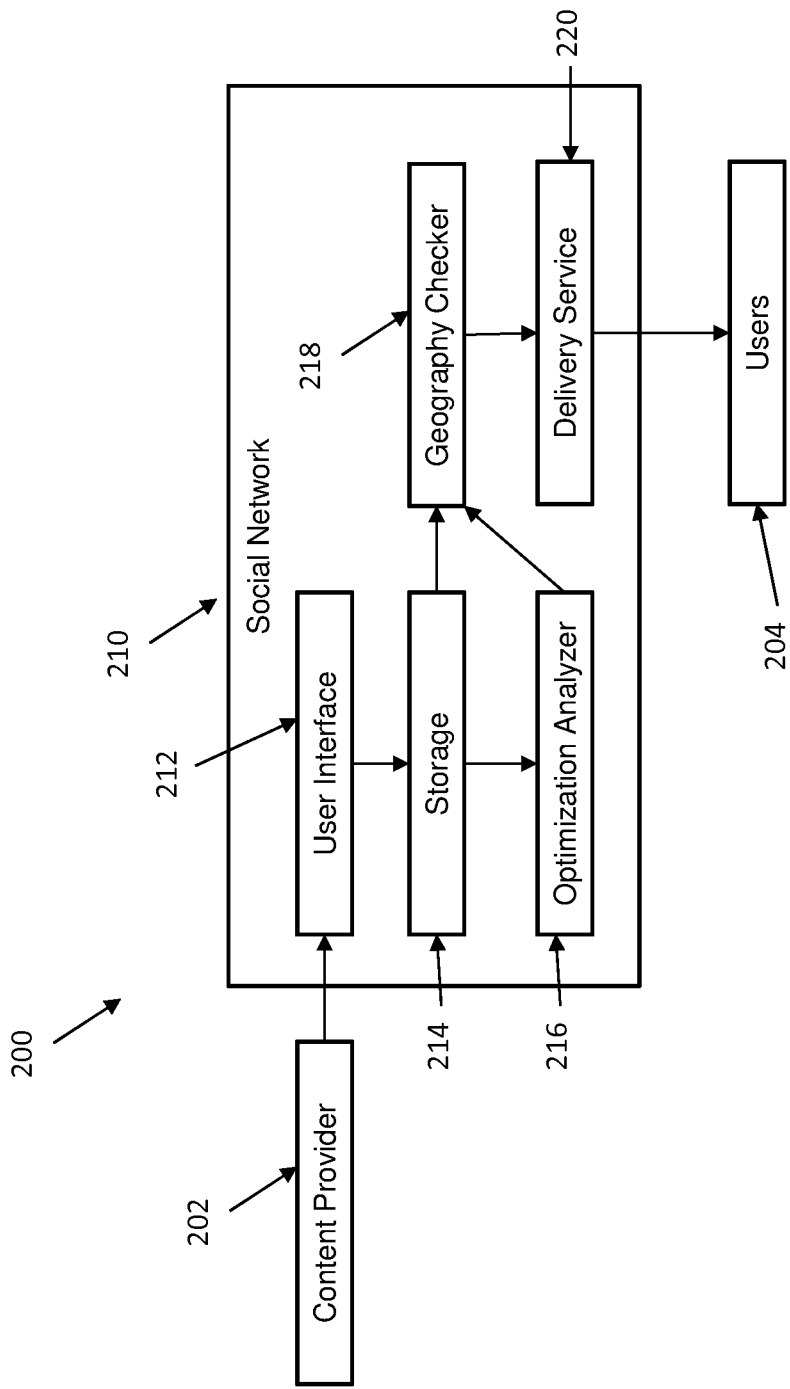
FIG. 2 is a block diagram illustrating a social network configured for optimizing postings in accordance with an exemplary embodiment.

Referring now to FIG. 2, a block diagram of a system 200 for optimizing posting in social networks is shown. As illustrated the system 200 includes one or more content providers 202, a social network 210 and one or more users 204. In exemplary embodiments, the one or more users 204 are users of the social network that may receive or view the content posted by the content providers 202. The social network includes a user interface 212, storage 214, an optimization analyzer 216, a geography checker 218, and a delivery service 220.

In exemplary embodiments, the social network 210 includes a user interface 212 that is configured to allow the content providers 202 to define target geographical locations for the content that they post to the social network. In one embodiment, the user interface 212 is configured to allow content providers 202 to define one or more target geographical locations where they would like their content to be viewed and a corresponding optimal viewing time for each geography. For example, a content provider 202 can set up preferences that a certain type of content, which can be identified by a specific tag, will be delayed at the receiving end from viewers of different geographical locations. In one embodiment, the content provider 202 may select the amount of time that the display of the content will be delayed. In another embodiment, the content provider 202 may allow the social network 210 to determine the amount of time that the display of the content will be delayed based on the optimum viewing time in each geography calculated by the social network 210.

In one example, a content provider 202 in New York would like to post a picture of food. The content provider 202 uses the user interface 212 to set up a preference that postings of food pictures, which can identified by the use of the hash tag #food or the like, should be delayed for viewing by users 204 until 9:00 am in the time zone that the user 204 is located. Accordingly, the social network 210 allows the content provider 202 to optimize the viewing of certain type of content by users 204 based on the geographical locations of the users 204.

In exemplary embodiments, the optimization analyzer 216 of the social network 210 is configured to analyze historical data of the usage of the social network 210, including the time and geography that each piece of content was viewed. The optimization analyzer 216 is further configured to produce a variety of reports regarding the usage of the social network 210. For example, the optimization analyzer 216 can produce a report of the best time window for comments or reposts per geographical locations based on given tags.

In exemplary embodiments, the optimization analyzer 216 is also configured to analyze related tags, which can be specific to particular geographical locations, that can be added to the content based the existing tags of the content. In one embodiment, the optimization analyzer 216 may be configured to identify tags that are related to one another based on common usage. For example, the hash tag #food may be commonly used with the hash tag #yummy. In addition, the optimization analyzer 216 may identify related tags that have the same meaning in various languages for example the hash tag #yummy may be related to the hash tag #ngonqua, which means "delicious" in Vietnamese, and the hash tag #sarap, which means "delicious" in the Filipino language.

In exemplary embodiments, the geography checker 218 is configured to store the preferences set by the content provider 202 via the user interface 212. For example, the geography checker 218 may store the preferences as seen in Table 1 below.

TABLE 1

| Target Geographies | Optimal viewing | Action | Hash Tags |
|---|---|---|---|
| US | now | no delay | any |
| China | from 9am to 10pm; local time in China | delay viewing | #food, #foodpics, #foodie |
| Europe | from 9am to 11:30pm local time in Europe | delay viewing | #bigapple #metropolitan |
| South Africa | from 8am to 10pm local time in South Africa | delay viewing | #sneakers #newtrend |

In exemplary embodiments, the geography checker 218 is configured to check the viewing time of the users 204 according to their geographical location. If the viewing time of the user 204 is not within the optimal time as set by the content provider 202, the geography checker 218 will add the required delay time for each user 204 based on the geography of the user 204. In exemplary embodiments, the geography checker 218 is also configured to consult with the optimization analyzer 216 to find the best time window for comments based on different geographical locations and to adjust the delay accordingly. For example, the optimization analyzer 216 may maintain a database of information regarding the best time window for displaying content based on the hash tags of the content and the geography of the users 204, as shown in Table 2 below.

TABLE 2

| Hash Tags | Time window when comments are generated | Number of comments | Geographies | Comment: |
|---|---|---|---|---|
| #food #foodpics #foodie | 9pm-3am EST | 80 | Asia (70%), US (25%), Europe (5%) | Asia viewers are active, it's 9am-3pm for them. |
| #food #foodpics #foodie | 3am-9am EST | 40 | Asia (90%), US (10%) | Asia viewers are more active. US viewers are sleeping. |
| #food #foodpics #foodie | 9am- 3pm EST | 30 | Asia (30%), US (60%), Europe (10%) | US viewers are more active. |
| #food #foodpics #foodie | 3pm-9pm EST | 20 | Asia (5%), US (90%), Europe (5%) | Asia viewers are inactive, it's 3am-9pm for them |

In exemplary embodiments, the geography checker 218 can also consult the optimization analyzer 216 to determine any related tags that can be added to the content to increase the number of people who will view the content. If there are related tags, the geography checker 218 will append additional tags to the content. In exemplary embodiments, the related tags may be geography specific labels or tags that can be added to a content to increase the number of viewers of the content in different geographical locations. For example, the optimization analyzer 216 may suggest additional tags and/or optimal viewing time as shown in Table 3, the suggested tags being shown in italics.

TABLE 3

| Target Geographies | Optimal viewing | Action | Tags |
|---|---|---|---|
| US | now | no delay | any |
| China | from 7am to 11pm local time in China, | delay viewing | #food, #foodpicks, #foodie, *#ngonqua #sarap* |

In exemplary embodiments, the delivery service 220 is configured to prevent the material that is posted by the content provider 202 from being delivered to or shown to the users 204 until the proper time based on the optimal viewing time for the geography of the user 204. In one embodiment, the delivery service 220 checks the optimization preferences stored in Table 1 and prevents access of the material from viewers of the targeted geographical locations until it is within the corresponding optimal viewing window.

In exemplary embodiments, the optimization analyzer 216 optimizes the delivery time of a content item or posting to different geographical locations so that the posting is available for viewing only within a convenient viewing time for the target audience. Accordingly, a content provider 202 can post a picture or message as usual, but the message will be put on hold to viewers until it is a convenient time for the viewers.

In exemplary embodiments, the delivery of content in the social network 210 is not based on posting time. Rather, the delivery of content is optimized based on the tags associated with the content and the targeted audience in different geographical locations. In one embodiment, the content will appear as newly posted content for certain geographical locations even though the actual posting time could be hours ago. In addition, any comments to or re-posts of the original content will also be delayed and then posted once the original content has been published to the user.

In one embodiment, a user can select to optimize posting based solely on the geographical location of the viewers. For example, the user can delay the viewing of his content from various viewers from different geographical locations until the timing is convenient for the viewers, regardless of the content of the posting. In another embodiment, a user can select to optimize posting based on geographical location and the type of content, as defined by tags associated with the content.

In yet another embodiment, a user can select to optimize posting based on an ideal time for generating user comments. For example, the optimization analyzer 216 may determine an optimal time window for posting a content item in order to generate comments on the posting and the user may opt to have the content posted during that time period. In many cases, the goal of a content provider 202 is to get more interactions with the users 204 as a result of the posting. In exemplary embodiments, historical data analyzed to determine what time of the day the viewers' comments are generated. These timestamps or time windows are considered a convenient time window for the active viewers who usually gave the comments. For example, Table 3 above is an example of the result of analyzing historical data. The largest comments were created at the window of 9 pm-3 am EST by Asia viewers. So if a content provider posts a picture at 6 pm EST, the pictures should delayed from viewing by the Asia viewers until it is 9 pm EST to maximize the comments.

Figure 3:
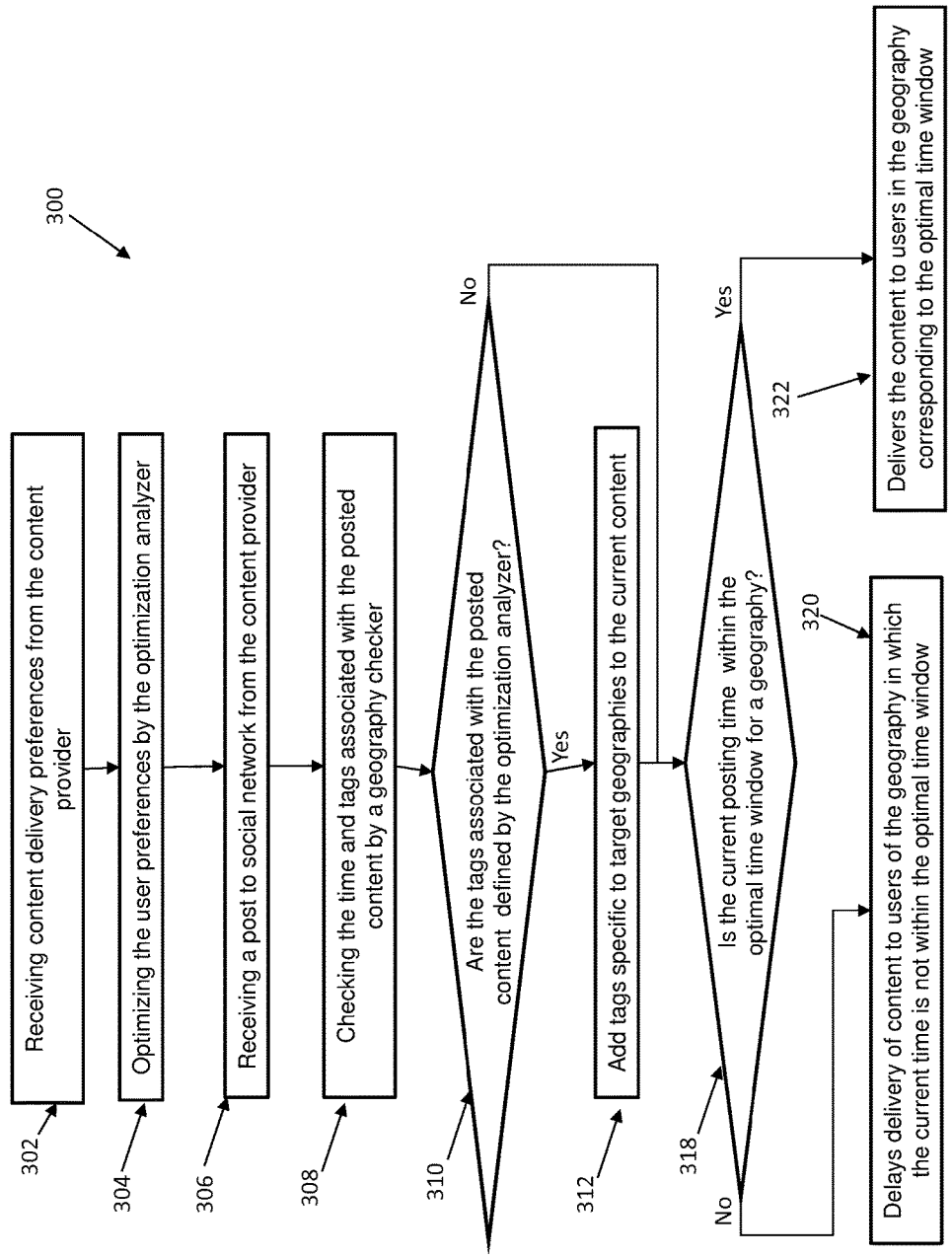
FIG. 3 illustrates a flow diagram of a method for optimizing postings in social networks in accordance with an exemplary embodiment.

Referring now to FIG. 3, a flow chart illustrating a method 300 for optimizing postings in social networks in accordance with an exemplary embodiment is shown. As shown at block 302, the method 300 includes receiving content delivery preferences from the content provider. Next, as shown at block 304, the method 300 includes adjusting the user preferences by the optimization analyzer. In exemplary embodiments, adjusting the user preferences may include adjusting the optimal time windows based on historical usage of users in specified geographic regions or adding related tags to tags provided by the user. As shown at block 306, the method 300 also includes receiving a post to social network from the content provider. In exemplary embodiments, the post may include one or more tags selected by the user.

Continuing with reference to FIG. 3, the method 300 includes checking the posting time and tags associated with the posted content by geography checker, as shown at block 308. The geography checker consults the optimization analyzer for optimization at block 310. Next, at decision block 310, the method 300 determines if there are the tags associated with the posted content that are defined by the optimization analyzer. If there are not tags associated with the posted content that is defined by the optimization analyzer, the method 300 proceeds to block 318 and continue with the next decision. Otherwise, the tags are known to the optimization analyzer, the optimizer analyzer looks up the associated tags that are specific to the target geographies. For example, the original content has the tag Mood, the optimizer analyzer finds the tags #sarap and #ngoqua for Philippines and Thailand viewers associated with the tag #food. The optimization analyzer suggests to geography checker to associate these tags with the content at block 312. The method proceeds to decision block 318 and determines if the current posting time within the optimal time window for a geography targeted by the posting. If the current posting time within the optimal time window for a geography targeted by the posting, the method 300 proceeds to block 320 and delivers the content to users in the geography corresponding to the optimal time window. Otherwise, the method 300 proceeds to block 322 and delays delivery of content to users the geography in which the current time is not within the optimal time window.

In exemplary embodiments, the content provider, the user that posts the content to a social network, has the freedom to post the content at anytime that is convenient to him. From a viewer's perspective, the content will be held until it is within a convenient time for his/her viewing. In one example, a content provider in the United States posts a picture to the social network at 2 pm, which is 2 am for China. Viewers from North America and Europe can view the content immediately once it is posted as the local time for them is convenient for their viewing. However, for users in Asia, the content will not be available for them until 5 or 6 hours later.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for optimizing postings in a social network comprising:

receiving one or more content delivery preferences from a content provider, wherein the one or more content delivery preferences comprise one or more hashtags that correspond to a geography associated with a desired time window for the geography and a content type associated with a desired time window for the content type;

receiving, by a processor, a post to the social network from the content provider at a posting time;

determining if the post includes one of the one or more hashtags, wherein the hashtags are associated with the social network;

determining if the posting time is within the desired time window for the geography and content type corresponding to one of the one or more hashtags;

based on a determining that the post includes at least one of the one or more hashtags and that the posting time is within the desired time window for the geography and the content type corresponding to the at least one of the one or more hashtags, delivering the post to one or more users of the social network that are disposed in the geography targeted by the post and are tagged for the content type; and based on a determining that the post includes at least one of the one or more hashtags and that the posting time is not within the desired time window for the geography and the content type corresponding to the at least one of the one or more hashtags, delaying delivery of the post to the one or more users of the social network that are disposed in the geography targeted by the post and are tagged for the content type until a local time in the geography is within the corresponding desired time window for the geography and the content type;

based on a determining that the post includes at least one of the one or more hashtags and that the posting time is not within the desired time window for the geography and the content type corresponding to the at least one of the one or more hashtags, delaying delivery of comments associated with the post to one or more users of the social network that are disposed in the geography targeted by the post and are tagged for the content type until a local time in the geography targeted by the post are tagged for the content type until a local time in the geography is within the corresponding desired time window for the geography and the content type;

wherein the post is available for viewing by one or more users in the geographic location only during the desired time window corresponding to the geographic location;

wherein the post is available for viewing by one or more users only during the desired time window corresponding to the content type;

adjusting the desired time window based on historical usage of users in a corresponding geography, wherein adjusting the desired time window based on historical usage of users in the corresponding geography comprises adjusting the desired time window to a time period in which the post will generate comments;

based at least in part on an analysis of the one or more hashtags, generating one or more related hashtags; and adjusting the one or more content delivery preferences based on the one or more related hashtags included in the post.

2. The method of claim 1, further comprising:
based on a determining that the post does not include at least one of the one or more hashtags, delivering the post to all users of the social network.

3. The method of claim 1, wherein delaying delivery of the post to the one or more users in the geography targeted by the post corresponding to the desired time window, further comprises delaying delivery of all postings to the social network that relate to the post.

4. The method of claim 1, wherein the one or more related tags are selected to maximize a number of viewers of the post.

5. A computer program product for optimizing postings in a social network, the computer program product comprising:
a non-transitory storage medium readable by a processing circuit and storing instructions for execution by the processing circuit for performing a method comprising:
receiving one or more content delivery preferences from a content provider, wherein the one or more content delivery preferences comprises one or more hashtags that correspond to a geography associated with a desired time window for the geography and a content type associated with a desired time window for the content type;
adjusting, by a processor, the one or more content delivery preferences by an optimization analyzer to create optimized content delivery preferences;
receiving a post to the social network from the content provider at a posting time;
determining if the post includes one of the one or more hashtags;
determining if the posting time is within the desired time window for the geography and content type corresponding to one of the one or more hashtags;
based on a determining that the post includes at least one of the one or more tags and that the posting time is within the desired time window for the geography and the content type corresponding to the at least one of the one or more hashtags, delivering the post to one or more users of the social network that are disposed in the geography targeted by the post and are tagged for the content type; and
based on a determining that the post includes at least one of the one or more hashtags and that the posting time is not within the desired time window for the geography and the content type corresponding to the at least one of the one or more hashtags, delaying delivery of the post to the one or more users of the social network that are disposed in the geography targeted by the post and are tagged for the content type until a local time in the geography is within the corresponding desired time window for the geography and the content type;

based on a determining that the post includes at least one of the one or more hashtags and that the posting time is not within the desired time window for the geography and the content type corresponding to the at least one of the one or more hashtags, delaying delivery of comments associated with the post to one or more users of the social network that are disposed in the geography targeted by the post and are tagged for the content type until a local time in the geography targeted by the post are tagged for the content type until a local time in the geography is within the corresponding desired time window for the geography and the content type;

wherein the post is available for viewing by one or more users in the geographic location only during the desired time window corresponding to the geographic location;

wherein the post is available for viewing by one or more users only during the desired time window corresponding to the content type;

adjusting the desired time window based on historical usage of users in a corresponding geography, wherein adjusting the desired time window based on historical usage of users in the corresponding geography comprises adjusting the desired time window to a time period in which the post will generate comments;

based at least in part on an analysis of the one or more hashtags, generating one or more related hashtags; and adjusting the one or more content delivery preferences based on the one or more related hashtags included in the post.

6. The computer program product of claim 5, further comprising:
based on a determining that the post does not include at least one of the one or more tags and, delivering the post to all users of the social network.

7. The computer program product of claim 5, wherein delaying delivery of the post to the one or more users in the geography targeted by the post corresponding to the desired time window, further comprises delaying delivery of all postings to the social network that relate to the post.

8. The computer program product of claim 5, wherein the one or more related tags are selected to maximize a number of viewers of the post.

9. A computer-implemented method for optimizing postings in a social network comprising:
receiving, by a processor, one or more content delivery preferences from a content provider, wherein the one or more content delivery preferences comprises one or more hashtags that correspond to a geography with a desired time window for the geography and a content type associated with a desired time window for the content type;
receiving a post to the social network from the content provider at a posting time;
determining if the posting time is within the desired time window for the geography and content type corresponding to one of the one or more hashtags;
based on a determining that the post includes at least one of the one or more hashtags and that the posting time is within the desired time window for the geography and the content type corresponding to the at least one of the one or more hashtags, delivering the post to one or more users of the social network that are disposed in the geography targeted by the post and are tagged for the content type; and
based on a determining that the post includes at least one of the one or more hashtags and the posting time is not within the desired time window for the geography and the content type, delaying delivery of the post to the one or more users of the social network that are disposed in the geography targeted by the post and are tagged for the content type until a local time in the geography is within the corresponding desired time window for the geographical location and the content type;

based on a determining that the post includes at least one of the one or more hashtags and that the posting time is not within the desired time window for the geography and the content type corresponding to the at least one of the one or more hashtags, delaying delivery of comments associated with the post to one or more users of the social network that are disposed in the geography targeted by the post and are tagged for the content type until a local time in the geography targeted by the post are tagged for the content type until a local time in the geography is within the corresponding desired time window for the geography and the content type;

wherein the post is available for viewing by one or more users in the geographic location only during the desired time window corresponding to the geographic location;

wherein the post is available for viewing by one or more users only during the desired time window corresponding to the content type;

adjusting the desired time window based on historical usage of users in a corresponding geography, wherein adjusting the desired time window based on historical usage of users in the corresponding geographic location comprises adjusting the desired time window to a time period in which the post will generate comments;

based at least in part on an analysis of the one or more hashtags, generating one or more related hashtags; and adjusting the one or more content delivery preferences based on the one or more related hashtags included in the post.

10. The method of claim 9, wherein delaying delivery of the post to the one or more users in the geographic location corresponding to the desired time window for the period of time, further comprises delaying delivery of all postings to the social network that relate to the post.

11. The method of claim 9, wherein the period of time is determined such that the post will be delivered during the desired time window.

\* \* \* \* \*